United States Patent
Matsura

[11] Patent Number: 6,151,895
[45] Date of Patent: Nov. 28, 2000

[54] HYDROSTATIC TRANSMISSION SYSTEM

[75] Inventor: Kimikazu Matsura, Zama, Japan

[73] Assignee: Kayaba Industry Co., Ltd., Japan

[21] Appl. No.: 09/186,004

[22] Filed: Nov. 4, 1998

[30]     Foreign Application Priority Data

Mar. 4, 1998    [JP]   Japan ................................. 10-069342

[51] Int. Cl.$^7$ ................................................. F16D 39/00
[52] U.S. Cl. ............................................ 60/490; 92/12.2
[58] Field of Search .......................... 60/487, 489, 490; 92/12.1, 12.2; 91/505

[56]            References Cited

U.S. PATENT DOCUMENTS

| | | | |
|---|---|---|---|
| 2,171,177 | 8/1939 | Hodgman | 60/490 X |
| 3,190,075 | 6/1965 | Ebert | 60/489 |
| 3,221,571 | 12/1965 | Badalini | 60/490 |
| 3,643,433 | 2/1972 | Widmaier | 60/489 X |
| 4,690,036 | 9/1987 | Kosaka et al. | 91/506 |
| 4,691,802 | 9/1987 | Ishimori et al. | 60/490 X |
| 4,856,264 | 8/1989 | Nishimura et al. | 60/490 X |
| 5,007,805 | 4/1991 | Goade et al. | 91/505 X |
| 5,184,536 | 2/1993 | Arai | 91/505 |
| 5,339,631 | 8/1994 | Ohashi | 60/487 |
| 5,630,707 | 5/1997 | Kim et al. | 92/12.2 X |
| 5,768,955 | 6/1998 | Hauser | 60/487 X |
| 5,826,488 | 10/1998 | Arai et al. | 92/12.2 |
| 6,014,961 | 1/2000 | Hauser et al. | 60/487 |

*Primary Examiner*—John E. Ryznic
*Attorney, Agent, or Firm*—Steinberg & Raskin, P.C.

[57]            ABSTRACT

An object of the present invention is to provide a hydrostatic transmission system integrally constructed without being large-sized while incorporating a variable displacement motor therein.

In order to accomplish the object, a casing 11 has a variable displacement pump 1 and a variable displacement motor 3 incorporated therein in a manner to be juxtaposed to each other. The pump 1 is constituted by a cam plate type axial plunger pump which is constructed so as to render a tilting angle of a cam plate 18 variable and render a discharge rate of hydraulic fluid zero when the tilting angle is within a range set near 0 degree. The motor 3 is constituted by a cam plate type axial plunger motor including a cam plate 33 of which a tilting angle is variable.

A cover 48 is provided with a pair of passages 2a and 2b, relief valves 9a and 9b, check valves 10a and 10b, and a change-over valve 5.

3 Claims, 7 Drawing Sheets

HYDROSTATIC TRANSMISSION SYSTEM

BACKGROUND OF INVENTION

This invention relates to a hydrostatic transmission system, and more particularly to a hydrostatic transmission system including a variable displacement pump and a variable displacement motor.

PRIOR ART

A vehicle such as a tractor, a combined harvester and thresher, or the like conventionally employs a structure for varying a reduction ratio of a gear mission to expand a velocity range thereof by way of example. Unfortunately, utilization of the gear mission fails to vary a velocity of the vehicle during traveling thereof and causes complication in structure of the vehicle and large-sizing thereof.

A hydrostatic transmission system of the separation type wherein a variable displacement pump and a hydraulic motor are arranged separately from each other is also used for this purpose. The hydrostatic transmission system permits a velocity of the vehicle to be varied in a stepless manner by controlling the variable displacement pump during traveling of the vehicle. However, this requires to arrange the variable displacement pump and hydraulic motor separately from each other, to thereby fail to solve the above-described problem of large-sizing of the vehicle.

Figure 7:
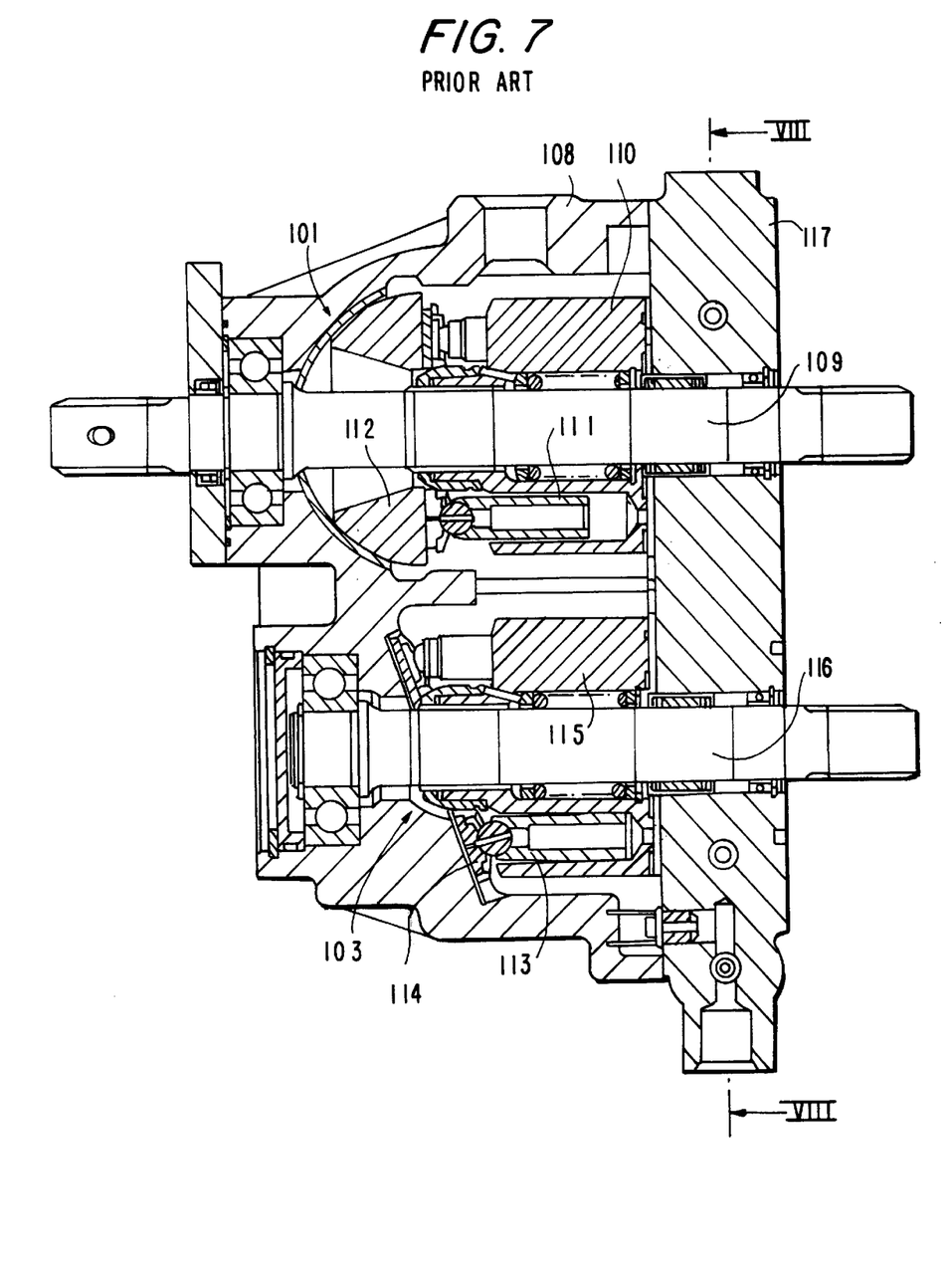
FIG. 7 is a sectional view of the conventional hydrostatic transmission system shown in FIG. 6.
Figure 8:
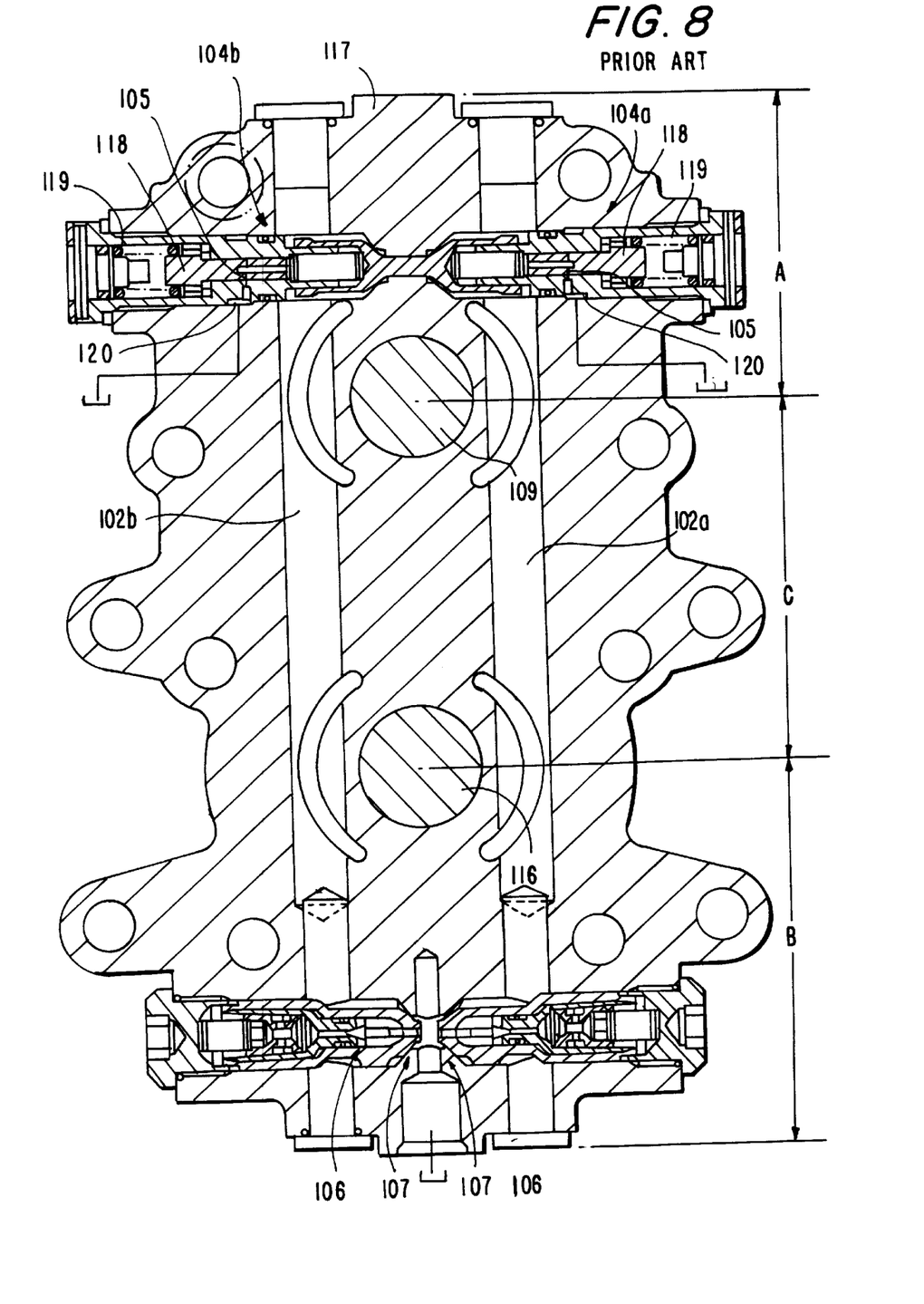
FIG. 8 is a sectional view taken along line VIII—VIII of FIG. 7.

In view of the foregoing, a hydrostatic transmission system wherein a variable displacement pump and a hydraulic motor are arranged integrally with each other is proposed. Such a hydrostatic transmission system of the integral type is constructed in such a manner as shown in FIGS. 6 to 8 by way of example.

Figure 6:
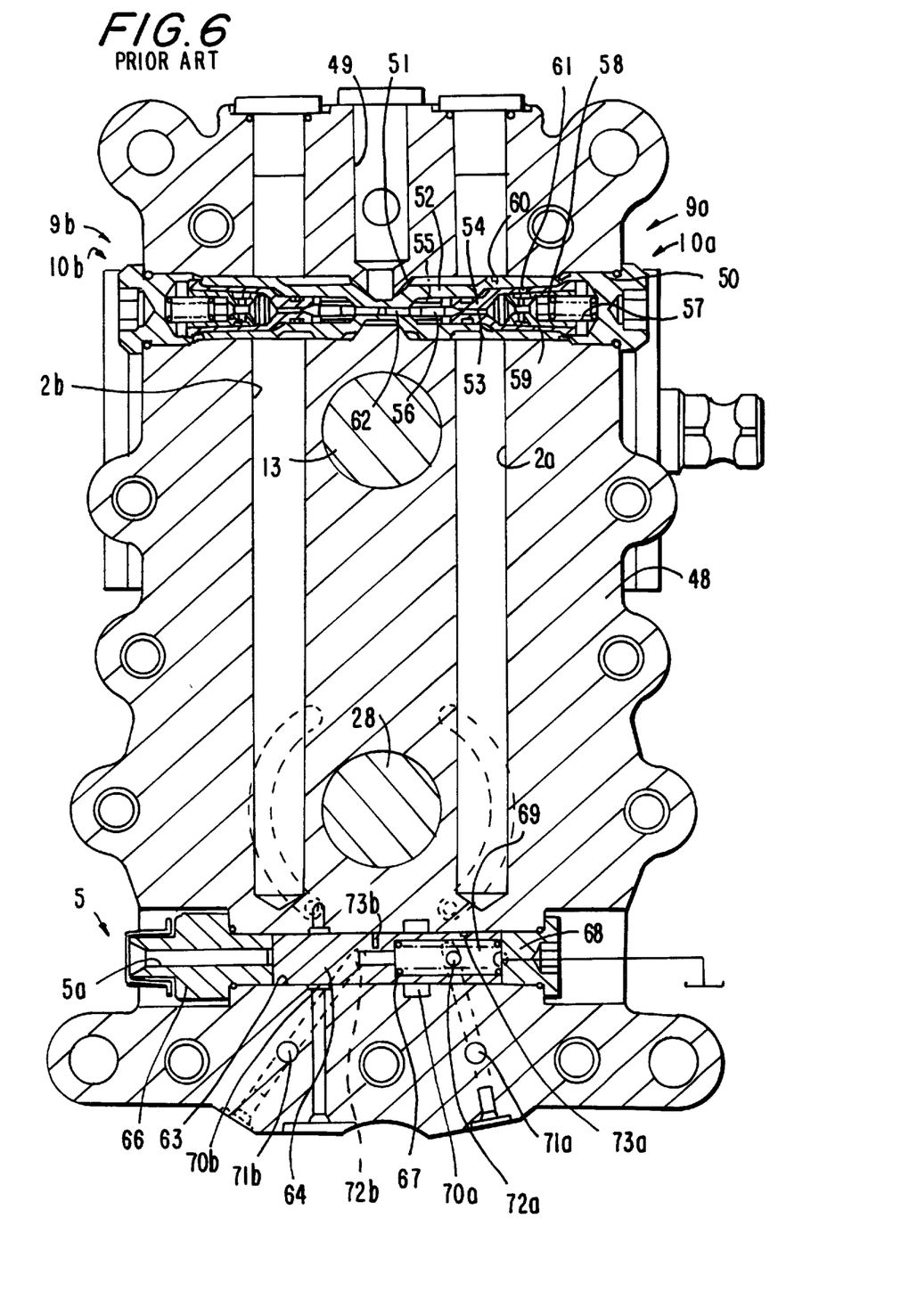
FIG. 6 is a circuit diagram showing a conventional hydrostatic transmission system.

The hydrostatic transmission system, as shown in FIG. 6, includes a variable displacement pump 101 and a fixed displacement motor 103 connected to the pump 101 through a pair of passages 102a and 102b.

The variable displacement pump 101 is constituted by a cam plate type axial plunger pump, wherein a tilting angle of a cam plate is varied to control forward movement of a vehicle, rearward movement thereof and stop thereof. More specifically, the variable displacement 101 is adapted to stop discharge of hydraulic fluid to stop of the fixed displacement motor 103 when an operation lever (not shown) is kept at a neutral position to render a tilting angle of the cam plate zero. Then, when the cam plate of which a tilting angle is zero is inclined in any direction, the pump discharges hydraulic fluid depending on the tilting angle to drive the fixed displacement motor 103, to thereby carry out forward movement of the vehicle or rearward movement thereof.

In this instance, when a neutral point of the operation lever for determining a tilting angle of the variable displacement pump 101 is single, it is highly difficult to ensure setting of the neutral point, so that handling of the operation lever is highly troublesome. Also, there occurs vibration in the vehicle, so that an operator is highly hard to set the operation lever at the neutral point even when he is skilled.

Then, when the operation lever is deviated from the neutral point to cause the cam plate of the variable displacement pump 101 to be even slightly moved from the tilting angle of 0 degree, the pump discharges hydraulic oil, to thereby fail to keep the fixed displacement motor 103 stopped.

In view of the foregoing, neutral valves 104a and 104b are connected to the passages 102a and 102b to provide the operation lever with a neutral width to a certain degree, respectively.

The neutral valves 104a and 104b permit the passages 102a and 102b to communicate to tanks through constrictions 105 when they are in a normal state. Thus, when the tilting angle is within a range set near 0 degree to restrict a discharge rate of hydraulic fluid from the pump to a reduced level, all the hydraulic fluid is returned to the tanks, to thereby permit stop of the fixed displacement motor 103.

On the contrary, when the tilting angle exceeds the set range described above, to thereby cause a discharge rate of hydraulic fluid from the pump to be increased, a pressure difference across each of the constrictions 105 is increased. Then, when a pressure on an upstream side of the constriction 105 reaches a predetermined level, the neutral valve 104a or 104b is changed over, to thereby interrupt communication between the passage 102a or 102b and the tank. This permits all hydraulic fluid discharged from the pump to be fed toward the fixed displacement motor 103, so that the fixed displacement motor 103 may be driven.

The passages 102a and 102b have a relief valve 106 connected thereto for protection of a circuit. For example, when a pressure in the passage 102a is excessively or abnormally increased, the pressure acts to open the relief valve 106. Such opening of the relief valve 106 permits the passage 102a increased in pressure to communicate with the passage 102b reduced in pressure, to thereby protect the circuit.

Also, the passages 102a and 102b are arranged so as to communicate with a charge pump 121 through check valves 107. The check valves 107 permit hydraulic fluid to flow from a side of the charge pump 121 to the passages 102a and 102b. Of the passages 102a and 102b, the passage reduced in pressure is fed with hydraulic fluid discharged from the charge pump 121 through the check valve 107.

The conventional hydrostatic transmission system thus constructed may be realized in such a manner as shown in FIGS. 7 and 8. The following description will be made mainly on positional relationship among the variable displacement pump 101, fixed displacement motor 103, and valves 104a, 104b, 106 and 107.

The variable displacement pump 101 and fixed displacement motor 103, as shown in FIG. 7, are incorporated in a casing 108.

The variable displacement pump 101 is so constructed that a cylinder block 110 is rotated together with an input shaft 109, resulting in a plunger 111 arranged therein being guided by a cam plate 112 to carry out stroke, to thereby discharge hydraulic fluid. A tilting angle of the cam plate 112 is varied through an operation lever (not shown), so that a fluid discharge rate may be varied.

Also, the fixed displacement motor 103 is basically constructed in substantially the same manner as the variable displacement pump 101 described above. However, operation of the fixed displacement motor 103 is carried out in order contrary to the pump 101. More particularly, hydraulic fluid discharged from the variable displacement pump 101 acts on a plunger 113, to thereby ensure stroke of the plunger 113. At this time, the plunger 113 is guided by a cam plate 114, to thereby carry out stroke, so that a cylinder block 115 may be rotated to rotate an output shaft 116.

The casing 108 is mounted thereon with a cover 117, which is formed with a pair of passages 102a and 102b which permit the variable displacement pump 101 and fixed displacement motor 103 to communicate with each other therethrough, as shown in FIG. 8.

The neutral valves 104a and 104b in a pair are arranged in the casing 108 in a manner to be positioned above the input shaft 109. The neutral valves 104a and 104b each function to permit selective communication between each of the passages 102a and 102b and the tank through a plunger 118 inserted into the casing 108 through the cover 117.

More specifically, the neutral valves 104a and 104b each function to normally keep each of the constrictions 105 communicating with a tank port 120 by means of a spring 119, to thereby permit each of the passages 102a and 102b to communicate with the tank. Then, when a pressure in each of the passages 102a and 102b reaches a predetermined level, the pressure acts to move the plunger 118 against the spring 119, to thereby deviate the constriction 105 from the tank port 120, resulting in interrupting communication between each of the 102a and 102b and the tank.

The relief valves 106 and check valves 107 are arranged below the output shaft 116 of the fixed displacement motor 103. Construction of the relief valves 106 and check valves 107 will be described below.

Unfortunately, substitution of a variable displacement motor for the fixed displacement motor 103 in the conventional hydrostatic transmission system thus constructed causes such problems as described below.

More particularly, use of the variable displacement motor requires a change-over valve for changing over a tilting angle of the variable displacement motor.

However, the casing 108 is provided therein with no space sufficient to receive such a change-over valve therein, as will be noted from FIG. 7.

Also, the cover 117, as shown in FIG. 8, has the neutral valves 104a and 104b already incorporated in a region A thereof. A region B of the cover 117 has the relief valves 106 and check valves 107 already arranged therein. Further, the cover 117 has the passages 102a and 102b formed in a region C thereof.

Thus, the casing 108 and cover 117 each are formed into a size which fails to permit the change-over valve for the variable displacement motor to be received therein. Therefore, actually it is required to mount the change-over valve on a vehicle while being separated from the variable displacement motor.

OBJECT OF INVENTION

Accordingly, it is an object of the present invention to provide a hydrostatic transmission system which is capable of being integrally constructed without causing large-sizing thereof while incorporating a variable displacement motor therein.

Means of Solution of Problems

In accordance with the present invention, a hydrostatic transmission system is provided. The hydrostatic transmission system includes a casing and a plate-like cover mounted on the casing. The casing is provided therein with a variable displacement pump and a variable displacement motor in a manner to be juxtaposed to each other. The variable displacement pump is constituted by a cam plate type axial plunger pump which includes a cam plate having a tilting angle variably set and is constructed so as to keep a discharge rate thereof zero when the tilting angle is within a range set near 0 degree. The variable displacement motor is constituted by a cam plate type axial plunger motor having a tilting angle variably set. The cover is formed with a pair of passages which permit the variable displacement pump and variable displacement motor to communicate with each other therethrough. The cover is provided therein with relief valves and check valves in a manner to be positioned at an end thereof on a side of the variable displacement pump and so as to communicate with said passages, respectively. The cover is provided therein with a change-over valve in a manner to be positioned at an end thereof on a side of the variable displacement motor, to thereby control a pressure for determining the tilting angle of the cam plate of the variable displacement motor.

In a preferred embodiment of the present invention, the variable displacement pump includes a movable thrust plate provided on the cam plate and operatively associated with plungers and a rotation regulating mechanism for regulating rotation of the movable thrust plate with respect to the cam plate, so that the movable thrust plate may be returned to a neutral position by neutral return force when the cam plate is tilted within the range set near 0 degree.

In a preferred embodiment of the present invention, the variable displacement motor includes a plurality of abutment surface sections defined at angles different from each other on a surface thereof opposite to a surface thereof on a side of plungers of the cam plate. Any of the abutment surface sections is abutted against the casing to vary the tilting angle of the cam plate.

BEST MODES FOR CARRYING OUT INVENTION

Now, a hydrostatic transmission system according to the present invention will be described hereinafter with reference to FIGS. 1 to 5.

Figure 1:
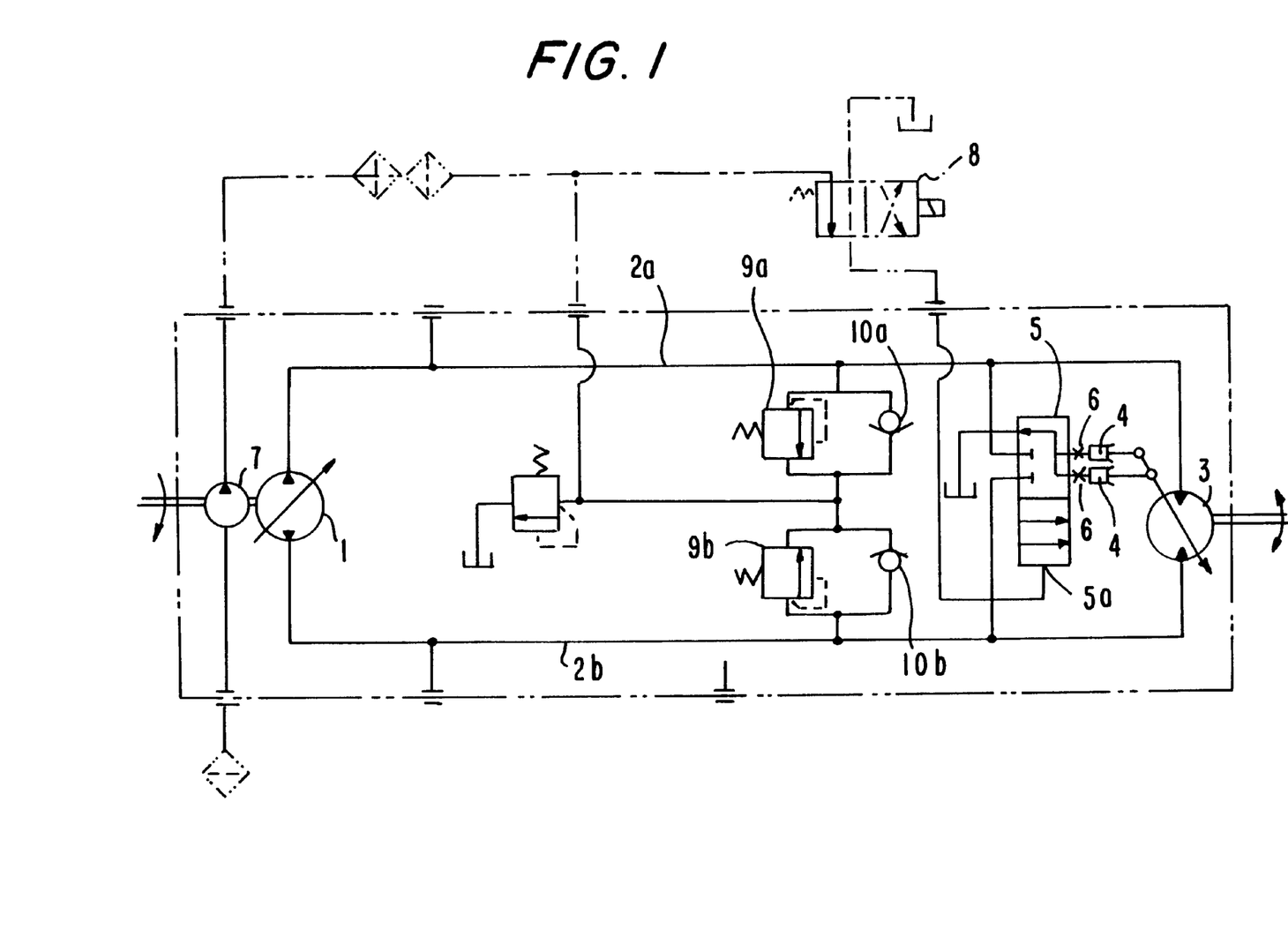
FIG. 1 is a circuit diagram showing an embodiment of a hydrostatic transmission system according to the present invention.

Referring first to FIG. 1, an embodiment of a hydrostatic transmission system according to the present invention is generally illustrated. A hydrostatic transmission system of the illustrated embodiment includes a variable displacement pump 1 and a variable displacement motor 3 connected to the variable displacement pump 1 through a pair of passages 2a and 2b.

The variable displacement pump 1 is so constructed that a discharge rate at which hydraulic fluid is discharged therefrom is kept zero when not only a tilting angle of the cam plate is exactly zero, but a cam plate is tilted within a range set near 0 degree, unlike the variable displacement pump 101 in the prior art described above.

The variable displacement pump 1 thus constructed keeps hydraulic fluid from being discharged therefrom, to thereby hold the variable displacement motor 3 stopped, even when the cam plate is tilted within the set range from 0 degree. This eliminates arrangement of the neutral valves 104a and 104b in the prior art described above.

Also, in the illustrated embodiment, the variable displacement motor 3 is constructed so as to be variable between two or high and low speed levels, unlike the fixed displacement motor 103 in the prior art described above.

The cam plate of the variable displacement motor 3 is operatively associated with a pair of control plungers 4; so that when a change-over valve 5 is at a position shown in FIG. 1, the control plungers 4 may be permitted to communicate with a tank, to thereby keep a capacity of the variable displacement motor 3 reduced. Whereas, when the change-over valve 5 is changed over, the control plungers 4 are permitted to communicate with the passages 2a and 2b, respectively. This results in a discharge pressure of the variable displacement pump 2 being applied or introduced through the passage 2a or 2b to the control plunger 4, leading to an increase in capacity of the variable displacement motor 3.

The hydrostatic transmission system of the illustrated embodiment also includes orifices 6 interposedly arranged between the control plungers 4 and the change-over valve 5 to reduce shock.

In the illustrated embodiment, a pilot pressure is utilized as a means for changing over the change-over valve 5.

For this purpose, a charge pump 7 is connected through a pilot valve 8 to a pilot chamber 5a of the change-over valve 5. This permits the pilot chamber 5a of the change-over valve 5 to communicate with the tank, to thereby keep the change-over valve 5 at a position shown in FIG. 1, when the pilot valve 8 is at a position shown in FIG. 1. Then, when the pilot valve 8 is changed over, the pilot chamber 5a of the change-over valve 5 is permitted to communicate with the charge pump 7, leading to changing-over of the change-over valve 5.

The passages 2a and 2b are connected to relief valves 9a and 9b, as well as check valves 10a and 10b as in the prior art.

Now, the hydrostatic transmission system of the illustrated embodiment will be more detailedly described with reference to FIG. 2.

Figure 2:
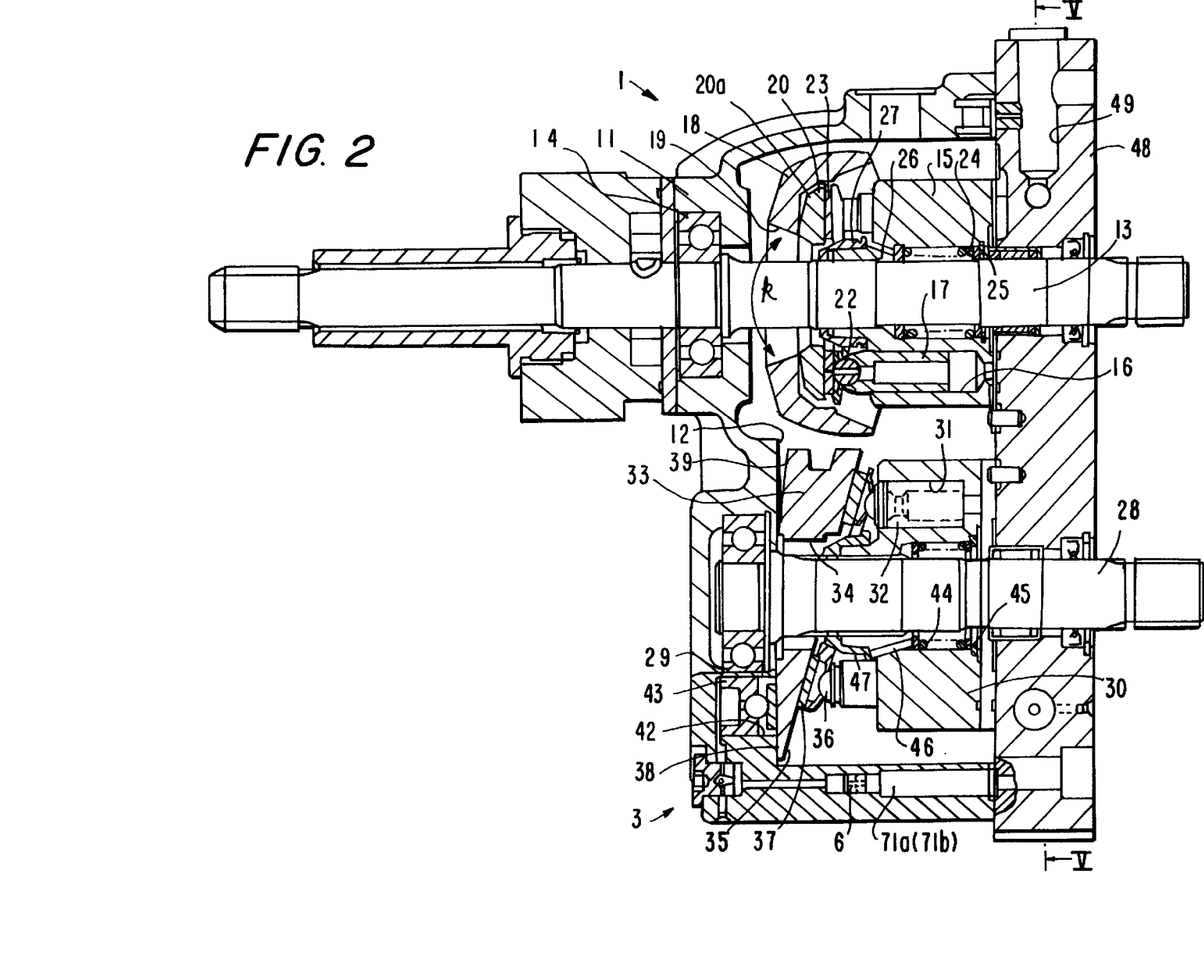
FIG. 2 is a sectional view of the hydrostatic transmission system shown in FIG. 1.

The variable displacement pump 1 and variable displacement motor 3, as shown in FIG. 2, are incorporated in a casing 11.

First, the variable displacement pump 1 will be described hereinafter.

As shown in FIG. 2, the casing 11 is provided therein with a receiving space 12, through which an input shaft 13 is inserted. The input shaft 13 is rotatably supported in the casing 11 by means of a bearing 14.

The input shaft 13 is mounted thereon with a cylinder block 15 by spline coupling. The cylinder block 15 is formed with a plurality of cylinders 16, in each of which a plunger 17 is slidably received.

The receiving space 12 is provided therein with a cam plate 18 formed with a through-hole 19, through which the above-described input shaft 13 is inserted.

The cam plate 18 is provided on both sides thereof with a pair of trunnion pins, which are arranged in a direction vertical to the sheet of FIG. 2 and pivotally supported on a side of the casing 11. Thus, inclination of the cam plate 18 about the trunnion pins in directions indicated at arrows k in FIG. 2 permits a tilting angle of the cam plate 18 to be varied.

Also, a movable thrust plate 20 is arranged opposite to the cam plate 18.

Figure 3A:
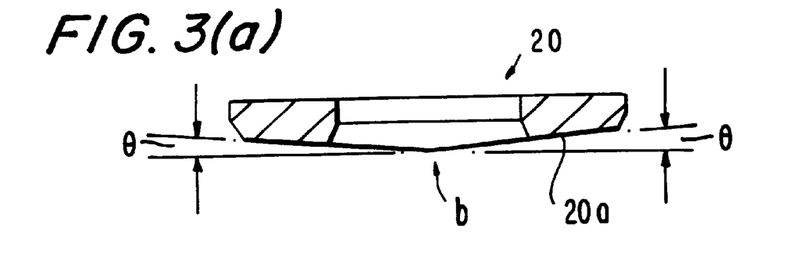
FIG. 3(a) is a sectional view showing a movable thrust plate 20 of a variable displacement pump 1, which is taken along line a—a of FIG. 3(b)

The movable thrust plate 20 has an opposite surface 20a positioned opposite to the cam plate 18, which is formed into a conical shape having an angle θ defined about a center o thereof, as shown in FIG. 3(a).

Figure 3B:
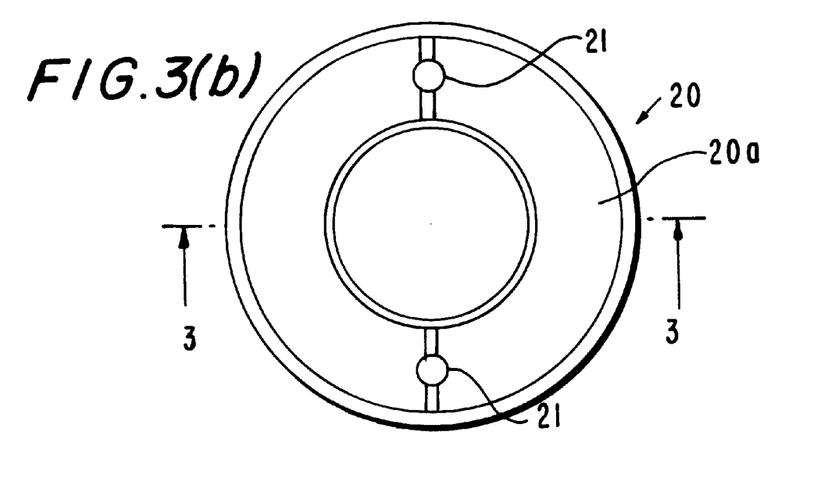
FIG. 3(b) is a view of the movable thrust plate of FIG. 3(a) which is taken along an arrow b in FIG. 3(a)

Further, the opposite surface 20a of the movable thrust plate 20, as shown in FIG. 3(b), is formed with ball holes 21. Likewise, the cam plate 18 is formed on a surface thereof opposite to the surface 20a of the movable thrust plate 20 with ball holes (not shown) in a manner to correspond to the ball holes 21. The ball holes each have a ball fitted therein so as to serve as a rotation regulating mechanism. Such construction regulates rotation of the movable thrust plate 20 with respect to the cam plate 18.

Further, as shown in FIG. 2, the plungers 17 incorporated in the cylinder block 15 each are operatively associated with a shoe 23 through a ball 22. The shoe 23 has an end surface abutted against the movable thrust plate 20.

The input shaft 13 is inserted through the cylinder block 15 so that a space may be defined between the input shaft 13 and the cylinder block 15. The space has a spring 24 received therein. The spring 24 is operatively associated at one end thereof with the cylinder block 15 through a stopper 24. Also, the spring 24 is operatively associated at the other end thereof with the shoe 23 through a rod 26 and a sleeve 27 arranged through the cylinder block 15. Such construction permits elastic force of the spring 24 to keep the cylinder block 15 abutted against a cover 48 described hereinafter and the shoe 23 abutted against the movable thrust plate 20.

In the variable displacement pump 1 thus constructed, rotation of the input 13 permits the cylinder block 15 to be likewise rotated through the spline coupling.

Then, when the operation lever (not shown) is operated to tilt the cam plate 18 in the direction indicated at arrows k under such a state, the opposite surface of the cam plate 18 forces the movable thrust plate 20, to thereby tilt the movable thrust plate 20. Such tilting of the movable thrust plate 20 permits each of the plungers 17 to carry out stroke in the cylinder 16 while being guided by the movable thrust plate 20. This results in the cylinder 16 discharging hydraulic fluid in an amount corresponding to stroke of the plunger 17.

The surface 20a of the movable thrust plate 20 opposite to the cam plate 18, as described above, is formed into a conical shape having an angle θ. This permits the movable thrust plate 20 to be independently tilted within a range of the angle θ with respect to the cam plate 18.

In general, a cam plate type axial piston pump is constructed so as to generate neutral return force which acts to return a cam plate to a neutral position, when a tilting angle of the cam plate is about 0 degree.

Thus, in the illustrated embodiment, even when the cam plate 18 is tilted within the set range of the angle θ, the neutral return force keeps the movable thrust plate 20 at a straight state. Thus, even when the tilting angle of the cam plate 18 is not exactly 0 degree, the movable thrust plate 20 is kept parallel with respect to the cylinder block 15, to thereby maintain the discharge rate at a zero state.

Now, the variable displacement motor 3 will be described.

As shown in FIG. 2, an output shaft 28 is inserted through the receiving space 12 of the casing 11 while being positioned substantially in parallel to the input shaft 13 of the variable displacement pump 1. The output shaft 28 is rotatably supported in the casing 11 by a bearing 29.

The output shaft 13 is mounted thereon with a cylinder block 30 by spline coupling. The cylinder block 30 is formed therein with a plurality of cylinders 31, in each of which a plunger 32 is slidably received.

Also, the receiving space 12 of the casing 11 has a cam plate 33 received therein, which is formed with a through-hole 34, through which the output shaft 28 is inserted.

Figure 4A:
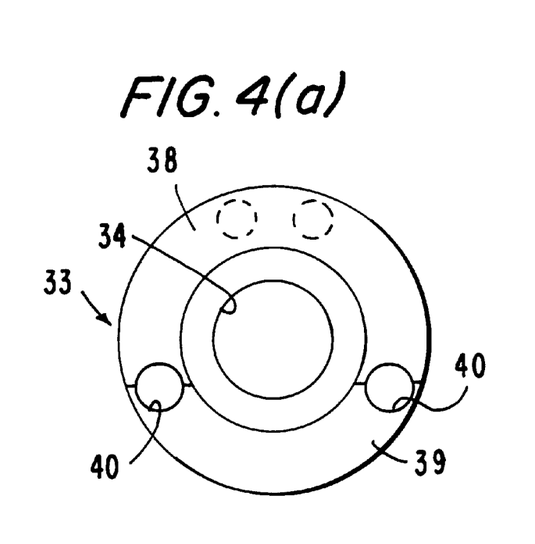
FIG. 4(a) is a plan view showing a cam plate 33 of a variable displacement motor 3.
Figure 4B:
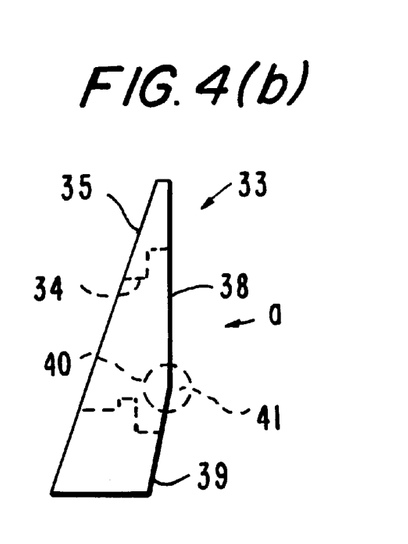
FIG. 4(b) is a side elevation view of the cam plate shown in FIG. 4(a)

The cam plate 33, as shown in FIG. 4(a), is formed into a donut-like or ring-like shape and has a tilting surface 35 arranged opposite to the cylinder block 30. The plungers 32 incorporated in the cylinder block 30 each are operatively associated at a distal end thereof with a shoe 37 through a ball 36. The shoe 37 is abutted at an end surface against the tilting surface 35.

Further, the cam plate 33, as shown in FIG. 4(a), is formed on a casing-side surface thereof facing an inner surface of the casing 11 with a first abutment surface section 38 and a second abutment surface section 39. The second abutment surface section 39 is formed in a manner to be contiguous to the first abutment surface section 38 and extend therefrom at an angle different from that of the first abutment surface section 38.

A boundary portion between the first abutment surface section 38 and the second abutment surface section 39 on the casing-side surface of the cam plate 33 is formed with a pair of ball holes 40. Likewise, the inner surface of the casing 11 is formed with ball holes (not shown) in a manner to correspond to the ball holes 40 of the cam plate 33. The ball holes each are fitted therein with such a ball as indicated at reference numeral 41. Such construction regulates rotation of the cam plate 33 with respect to the casing 11.

Also, as shown in FIG. 2, the casing 11 is formed on the inner surface thereof with two control cylinder holes 42, although only one such control cylinder hole 42 is shown. The control cylinder holes 42 are arranged in juxtaposition to each other in a direction perpendicular to the sheet of FIG. 2.

The control cylinder holes 42 each have a control plunger 43 slidably received therein. The control plunger 43 functions to permit thrust thereof obtained due to application of a pilot pressure to the control plunger 43 to act on an upper end of the first abutment surface section 38 of the cam plate 33 as indicated at dotted lines in FIG. 4(a).

The control cylinder hole 42 and control plunger 43 cooperate with each other to provide each of the control cylinders 4 shown in FIG. 1.

The output shaft 28 is inserted through the cylinder block 30 with a space being defined therebetween, in which a spring 44 is arranged. The spring 44 is operatively associated at one end thereof through a stopper 45 with the cylinder block 30. Also, the spring 44 is operatively associated at the other end thereof with the shoe 37 through a rod 46 and a sleeve 47 arranged in the cylinder block 30. Such construction permits elastic force of the spring 44 to keep the cylinder block 30 abutted against a cover 48 described below and the shoe 37 abutted against the slanting surface 35 of the cam plate 33.

In the variable displacement motor 3 thus constructed, hydraulic fluid discharged from the variable displacement pump 1 is fed to each of the plungers 31 of the cylinder block 30. Then, when the plunger 32 in the cylinder 31 carries out stroke, it is guided by the slanting surface 35 of the cam plate 33, leading to rotation of the cylinder block 30. This causes rotation of the output shaft 28 through the spline coupling, which is then externally transmitted.

When the control cylinder holes 42 each communicate with the tank to keep any driving force or thrust from being generated at the control plunger 43, the cam plate 33, as shown in FIG. 2, keeps the first abutment surface section 38 abutted against the inner surface of the casing 11 by means of elastic force of the spring 44.

Whereas, a pilot pressure is applied to any of the control cylinder holes 42 to permit the control plunger 43 to generate thrust, the thrust acts on an upper end of the first abutment surface 38 of the cam plate 33. This causes the cam plate 33 to be tilted about the balls 41, resulting in the first abutment surface section 38 being separated from the inner surface of the casing 11 and the second abutment surface section 39 abutted against the inner surface of the casing 11.

Thus, inclination of the cam plate 33 through the first and second abutment surface sections 38 and 39 permits an angle of the slanting surface 35 with respect to the cylinder block 30 to be varied. This leads to a difference in stroke of the plunger 32, so that a rotational speed of the output shaft 20 may be varied between two or high and low speed levels. Turning force of the output shaft 20 is then externally transmitted.

The illustrated embodiment, as described above, is so constructed that the cam plate 33 is arranged separately from the casing 11 and the first and second abutment surface sections 38 and 39 are abutted against the inner surface of the casing 11. Such construction eliminates arrangement of the cam plate 114 in the casing 108 in the prior art described above with reference to FIG. 7. Thus, incorporation of the variable displacement motor 3 in the casing 11 may be carried out with improved efficiency, because all parts including the bearing 29 and the like may be incorporated therein from a side of the cover 48.

Figure 5:
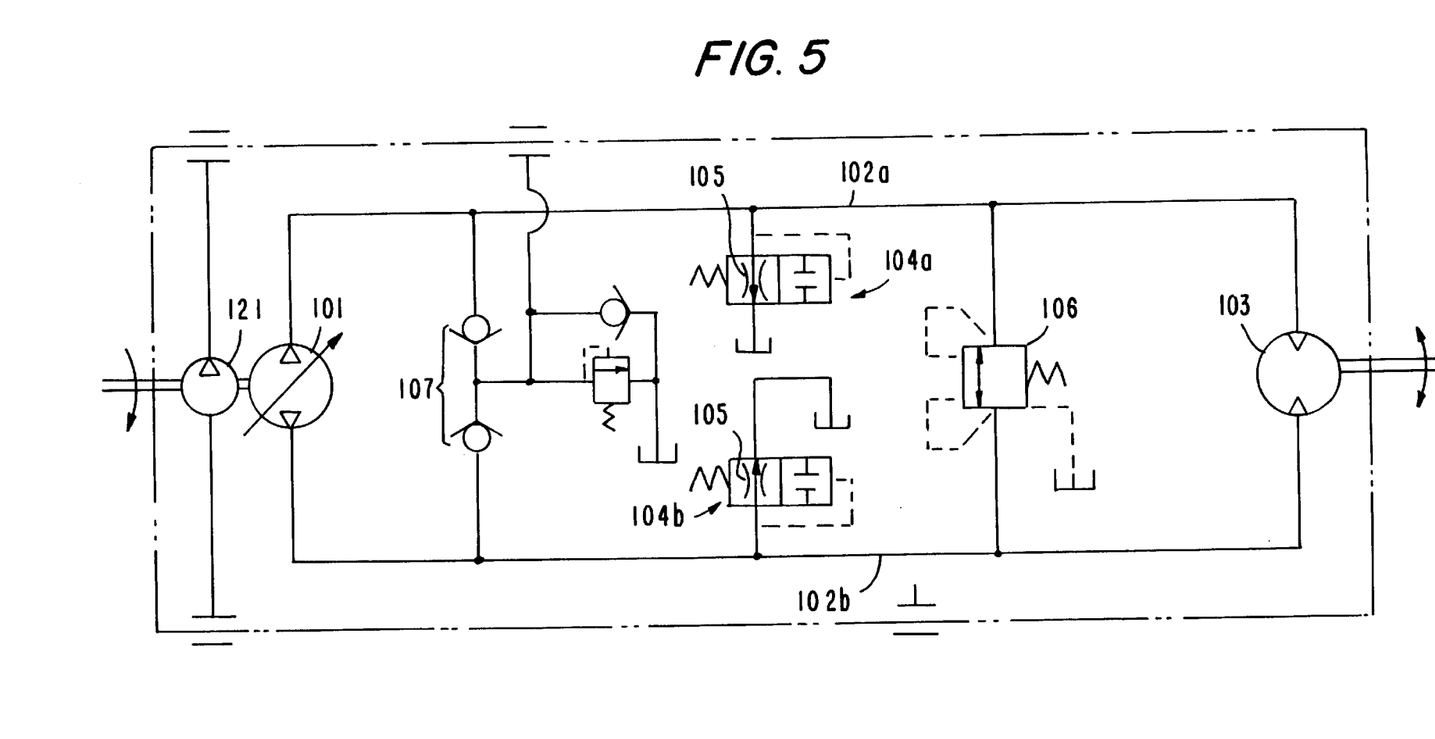
FIG. 5 is a sectional view taken along line V—V of FIG. 2.

Also, as shown in FIG. 5, the plate-like cover 48 mounted on the casing 11 is formed with the passages 2a and 2b in a pair through which the variable displacement pump 1 and variable displacement motor 3 communicate with each other.

Further, the cover 48 is formed at an end thereof positioned on a side of the variable displacement pump 1 with a charge passage 49 connected to the charge pump 7. The charge passage 49 is arranged at a position between the passages 2a and 2b.

In addition, the cover 48 is provided at the end thereof with the relief valves 9a and 9b and check valves 10a and 10b, which are arranged above the input shaft 13 of the variable displacement pump 1. Now, such arrangement will be more detailedly described hereinafter. In this respect, the following description will be made in connection with only the relief valve 9a and check valve 10a for the sake of brevity.

The cover 48 is formed therein with a receiving hole or space 50 in a manner to inwardly extend from one of sides thereof. The receiving hole 50 is arranged so as to communicate with the passage 2a and charge passage 49. Also, the receiving hole 50 is formed at a portion thereof facing the charge passage 49 with a seat portion 51.

The receiving hole 50 has a check member 52 of a semicylindrical shape slidably received therein and adapted to be seated on the seat portion 51. When the check member 52 is seated on the seat portion 51, the check member 52 is abutted at a distal end thereof against a distal end of a check member 52 arranged on a side of the passage 2b.

The check member 52 is provided on an inner peripheral surface thereof with a support member 54 which is formed with a passage 53 so as to extend in an axial direction thereof. The support member 54 is fixed at a proximal end of an outer peripheral surface thereof on the inner peripheral surface of the check member 52. The check member 52 has a spring 55 and a poppet member 56 received therein. The spring 55 acts to force the poppet member 56 against the support member 54 to close the passage 53.

Also, the support member 54 is provided on the inner peripheral surface thereof with a spring receiving member 58 on which elastic force of a spring 57 acts. Reference numeral 59 designates a filter which is interposedly arranged between a distal end of the spring receiving member 58 and the inner peripheral surface of the support member 54. The spring exhibits elastic force which acts on the check member 52 from the spring receiving member 58 through the support member 54, so that the check member 52 may be forced against the seat member 51.

The check member 52 is formed on a side surface thereof with a communication hole 60 which permits the passage 2a to communicate with the inner peripheral surface of the check member 52. This results in hydraulic fluid which is guided through the communication hole 60 acting on the poppet member 56 through a gap between the inner peripheral surface of the check member 52 and the support member 54, a small hole 61 formed through a side wall of the support member 54, a passage formed at the spring receiving member 58, the filter 59 and the passage 53 of the support member 54. Concurrently, hydraulic fluid in the passage 2a is fed through the passage of the spring receiving member 58 to a spring chamber in which the spring 57 is received, to thereby act as a back pressure on the check member 52.

Supposing that the variable displacement pump 1 is driven to produce a high pressure in the passage 2a and a low pressure in the passage 2b, hydraulic fluid guided from the charge pump 7 to the charge passage 49 acts on the check member 52. The check member 52 arranged on the side of the passage 2a is kept from being moved by elastic force of the spring 57 and a pressure in the passage 2a guided to the spring chamber, whereas the check member 52 on the side of the passage 2b is moved against the spring, to thereby be released or separated from the seat portion 51. Such separation of the check member 52 from the seat portion 51 causes hydraulic fluid in the charge passage 49 to be fed to the passage 2b reduced in pressure.

Thus, the check member 52, spring 57 and the like cooperate with each other to provide the check valve 10a.

When a pressure in the passage 2a is abnormally or excessively increased, the poppet member 56 is moved against the spring 55 to open the passage 53 of the support member 54, because a pressure in the passage 2a acts on the poppet member 56. Opening of the passage 53 permits a part of hydraulic fluid in the passage 2a to escape through a passage 62 formed at a distal end of the check member 52 toward the passage 2b.

Thus, the poppet member 56, spring 55 and the like cooperate with each other to constitute the relief valve 9a.

The cover 48 has the change-over valve 5 incorporated in an end thereof facing the variable displacement motor 3 while being positioned below the output shaft 20 of the variable displacement motor 3.

More particularly, the cover 48 is formed therein with a receiving hole 63 in a manner to inwardly extend from one side thereof, in which a spool 64 is slidably received. Also, the receiving hole 63 has a plug 66 received therein from a left-hand side thereof and a spring 67 and a plug 68 received from a right-hand side thereof. The spring 67 is arranged in a spring chamber 69 formed in the receiving hole 63 so as to communicate with a tank. The plug 66 is formed therein with the pilot chamber 5a.

Also, the cover 48 is formed with ports 70a and 70b communicating with the passages 2a and 2b, respectively. The cover 48 is further formed with pilot ports 72a and 72b so as to be arranged at positions deviated from the ports 70a and 70b, respectively.

The pilot ports 72a and 72b are arranged so as to communicate with pilot passages 71a and 71b formed via the casing 11. The pilot passages 71a and 71b, as shown in FIG. 2, each function to guide a pilot pressure to each of the control cylinder holes 43. The pilot passages 71a and 71b each are formed at an intermediate portion thereof with an orifice 6 for reducing shock.

Communication between the pilot chamber 5a and the tank through the pilot valve 8 (FIG. 1) permits the spool 64 to be kept abutted against the plug 66 as shown in FIG. 5. This causes the ports 70a and 70b to be isolated from the pilot ports 72a and 72b, respectively. Also, it causes the pilot ports 72a and 72b to communicate through the spring chamber 69 with the tank.

At this state, the pilot passages 71a and 71b are kept communicating with the tank, so that a pressure in the tank is applied to the control cylinder holes 42. Thus, any thrust is not generated at each of the control plungers 43, so that the first abutment surface section 38 of the cam plate 33 of the variable displacement motor 3 may be kept abutted against the inner surface of the casing 11.

Whereas, when the pilot valve 8 (FIG. 1) is changed over to guide a discharge pressure of the charge pump 7 to the pilot chamber 5a, the pressure acts to change over the spool 64 against the spring 67. This permits the ports 70a and 70b to communicate through an annular groove of the spool 64 with the pilot ports 72a and 72b, respectively. Concurrently, the pilot ports 72a and 72b are isolated from the spring chamber 69 and therefore the tank.

Under such conditions, a pressure increased in the passage 2a or 2b is introduced through the pilot port 72a or 72b to any one of the control cylinder holes 42. This causes thrust to occur at any one of the control plungers, so that the second abutment surface section 39 of the camp late 33 of the variable displacement motor 3 is abutted against the inner surface of the casing 11, as described above.

The spool 64 is formed with constriction holes 73a and 73b which permit an outer peripheral surface of the spool 64 to communicate with the spring chamber 69. Also, a clearance is defined between the receiving hole 63 and the outer peripheral surface of the spool 64 so as to permit the ports 70a and 70b to communicate with the constriction holes 73a and 73b, respectively, although it is not shown in FIG. 5.

Therefore, hydraulic fluid in the passages 2a and 2b is returned in a slight amount from the ports 70a and 70b through the clearance, constriction holes 73a and 73b, and spring chamber 69 to the tank. Also, hydraulic fluid is supplemented from the charge pump 7 to the variable displacement pump 1, so that hydraulic fluid in a closed circuit provided by the variable displacement pump 1 and variable displacement motor 3 is replaced little by little, to thereby minimize a deterioration in hydraulic fluid in the closed circuit.

Thus, the hydrostatic transmission system of the illustrated embodiment is so constructed that the variable displacement pump 1 is constituted by a cam plate type axial plunger pump adapted to keep a discharge rate thereof zero when a tilting angle is within a range set near 0 degree. Such construction eliminates arrangement of the neutral valves 104a and 104b in the prior art described above. Also, in the illustrated embodiment, the relief valves 9a and 9b, check valves 10a and 10b, and change-over valve 5 are incorporated in the cover 48. Thus, the illustrated embodiment provides the hydrostatic transmission system integrated with the casing 11 and cover 48 while being prevented from being large-sized, irrespective of incorporation of the variable displacement motor 3 therein.

As can be seen from the foregoing, in the hydrostatic transmission system of the present invention, the variable displacement pump is constituted by a cam plate type axial plunger pump adapted to keep a discharge rate thereof zero when a tilting angle is within a range set near 0 degree. This ensures the neutral width without any additional valve such as a neutral valve. Concurrently, the relief valves, check valves and change-over valve are incorporated in the cover. Thus, the hydrostatic transmission system of the present invention may be integrated with the casing and cover while being prevented from being large-sized irrespective of use of the variable displacement motor.

Also, the present invention may be constructed so that the movable thrust plate is incorporated in the variable displacement pump. Thus, the variable displacement pump permits a tilting angle of the cam plate to be varied without being substantially kept from being large-sized. Also, it keeps a discharge rate thereof zero when the tilting angle is in a range set near 0 degree.

Further, in the hydrostatic transmission system of the present invention, the variable displacement motor may be constructed in the manner that the cam plate is provided with abutment surface sections. Thus, the variable displacement motor may be kept from being large-sized.

| | |
|---|---|
| 1 | Variable displacement pump |
| 2a, 2b | Passage |
| 3 | Variable displacement motor |
| 5 | Change-over valve |
| 9a, 9b | Relief valve |
| 10a, 10b | Check valve |
| 11 | Casing |
| 17 | Plunger |
| 18 | Cam plate |
| 20 | Movable thrust plate |
| 20a | Opposite surface |
| 22 | Ball |
| 32 | Plunger |
| 33 | Cam plate |
| 38 | First abutment surface section |
| 39 | Second abutment surface section |
| 48 | Cover |
| 52 | Poppet member |
| 64 | Spool |

What is claimed is:

1. A hydrostatic transmission system comprising:

a casing (11);

a plate-like cover (48) mounted on said casing (11);

said casing (11) being provided therein with a variable displacement pump (1) and a variable dispalcement motor (3) in a manner to be juxtaposed to each other;

said variable dispalcement pump (1) being constituted by a cam plate type axial plunger pump which includes a cam plate (18) having a tilting angle variably set and is constructed so as to keep a discharge rate thereof zero when the tilting angle is within a range set near 0 degree;

said variable dispalcement motor (3) being constituted by a cam plate type axial plunger motor having a tilting angle variably set;

said cover (48) being formed with a pair of passages (2a, 2b) which permit said variable displacement pump (1) and variable dispalcement motor (3) to communicate with each other therethrough;

said cover (48) being provided therein with relief valves (9a, 9b) and check valves (10a, 10b) in a manner to be positioned at an end thereof on a side of said variable displacement pump (1) and so as to communicate with said passages (2a, 2b), respectively;

said cover (48) being provided therein with a change-over valve (5) in a manner to be positioned at an end thereof on a side of said variable dispalcement motor (3), to thereby control a pressure for determining the tilting angle of said cam plate (33) of the variable displacement motor (3).

2. A hydrostatic transmission system as defined in claim 1, characterized in that said variable displacement pump (1) includes a movable thrust plate (20) provided on said cam plate (18) and operatively associated with plungers (17) and a rotation regulating mechanism for regulating rotation of said movable thrust plate (20) with respect to said cam plate (18), so that said movable thrust plate (20) may be returned to a neutral position by neutral return force when said cam plate (18) is tilted within said range set near 0 degree.

3. A hydrostatic transmission system as defined in claim 1, characterized in that said variable displacement motor (3) includes a plurality of abutment surface sections (38, 39) defined at angles different from each other on a surface thereof opposite to a surface thereof on a side of plungers (32) of said cam plate (33); and any of said abutment surface sections (38, 39) is abutted against said casing (1) to vary the tilting angle of said cam plate (33).

\* \* \* \* \*